May 12, 1925. 1,537,222
A. CASTELLANI
MECHANISM FOR TRANSFORMING A DISPLACEMENT OF A MEMBER INTO AN INVERSELY
PROPORTIONAL DISPLACEMENT OF ANOTHER MEMBER
Filed Nov. 3, 1923 2 Sheets-Sheet 1

Inventor:—
Antoine Castellani
By Mauro, Cameron, Lewis & Kerkam
Attorneys

May 12, 1925.                                                          1,537,222
A. CASTELLANI
MECHANISM FOR TRANSFORMING A DISPLACEMENT OF A MEMBER INTO AN INVERSELY
PROPORTIONAL DISPLACEMENT OF ANOTHER MEMBER
Filed Nov. 3, 1923                     2 Sheets-Sheet 2

Inventor:-
Antonio Castellani,
By Mauro, Cameron, Lewis & Massey
Attorneys

Patented May 12, 1925.

1,537,222

UNITED STATES PATENT OFFICE.

ANTOINE CASTELLANI, OF PARIS, FRANCE, ASSIGNOR TO SOCIETE D'OPTIQUE ET DE MECANIQUE DE HAUTE PRECISION, OF PARIS, FRANCE, A LIMITED JOINT STOCK COMPANY.

MECHANISM FOR TRANSFORMING A DISPLACEMENT OF A MEMBER INTO AN INVERSELY PROPORTIONAL DISPLACEMENT OF ANOTHER MEMBER.

Application filed November 3, 1923. Serial No. 672,689.

*To all whom it may concern:*

Be it known that I, ANTOINE CASTELLANI, a citizen of the Republic of France, residing at Paris, France, have invented new and useful Improvements in Mechanism for Transforming a Displacement of a Member into an Inversely Proportional Displacement of Another Member, which is fully set forth in the following specification.

The present invention has for its subject a mechanism, which may be used for example in range finders and inclinometers, for transforming the amount of displacement (N) of a member, into a displacement of inversely proportional amount $\left(\frac{1}{N}\right)$ of another member, for different values of N. The mechanism allows of obtaining this result for values of N varying between great limits.

The new inversion apparatus is based on a special property of the hyperbola. In principle, and according to the invention, the inversion apparatus consists in a mechanism, in which a movable element is kept in contact with a hyperbolic guide, the movements of this movable element being transmitted to two other movable members, of which one traverses a distance equal to the sum of two inter-related lengths, while the other traverses in the same time the difference of these lengths, the said inter-related lengths being such that the distances traversed by the latter two movable members may always be inversely proportional to one another.

Various constructional examples of the invention are represented in the accompanying drawings, in which:—

Figures 1 and 2 respectively show in plan, and in section along the line 2—2 of Fig. 1, a constructional example of the invention, in which the hyperbolic guide for the element connected to the members having inversely proportional displacements, is constituted by a hyperbola which is based on rectangular co-ordinates, but whose asymptotes may be inclined to each other at any angle.

It is known that the equation of this hyperbola is:—

$$\frac{y^2}{b^2} - \frac{x^2}{a^2} = 1,$$

$a$ and $b$ being two arbitrary constants.

This equation can be written $$\frac{a^2}{b^2} y^2 - x^2 = a^2$$

or $$\left(\frac{a}{b}y - x\right)\left(\frac{a}{b}y + x\right) = a^2$$

It is therefore immediately seen that the values $$\frac{a}{b}y - x \text{ and } \frac{a}{b}y + x$$

are always inversely proportional to each other.

Figure 1:
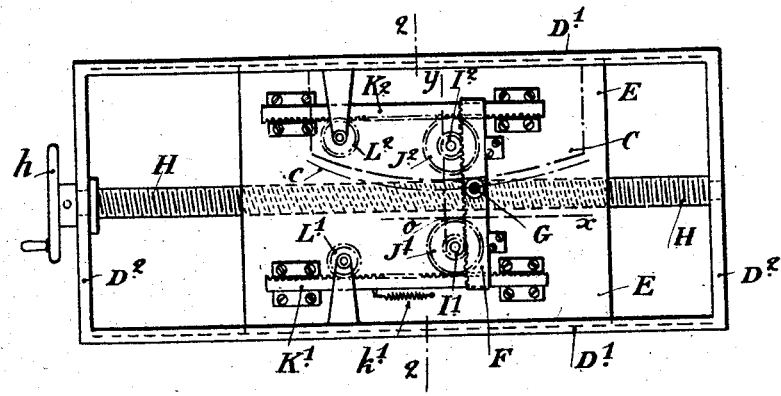
Figure 2:
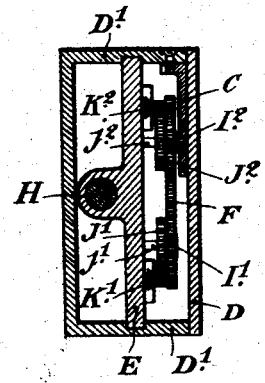

In the mechanisms represented by Figures 1 and 2, an element moving in contact with a cam determined by the equation $$\frac{y^2}{b^2} - \frac{x^2}{a^2} = 1$$

provides at each instant, a displacement of amount $x$ and a displacement of amount $\frac{a}{b}y$; it is then easy, through this element, to control two other members, so that one will be displaced by the amount $\frac{a}{b}y - x$ and the other by the amount $\frac{a}{b}y + x$.

In the example represented, a hyperbolic guide C, formed according to the above mentioned equation $$\frac{y^2}{b^2}-\frac{x^2}{a^2}=1,$$

is secured to a frame D having the form of a box, in the long sides D¹ of which a carriage E is slidably mounted so that it may move parallel to the axis o—x of the said guide C.

Upon the carriage E a rack F is slidably mounted so that it may move parallel to the axis o—y of the hyperbolic guide, while the rack F carries the axle of a roller G which is maintained in contact with the said guide C. A screw H, rotatably mounted in the transverse sides D² of the frame, is engaged in a nut formed under the carriage E, so that in operating the hand-wheel h, keyed on the screw H, the carriage E is displaced by the amount x, and consequently the roller G, contacting with the guide C is displaced along the carriage E at the same time by the amount y.

The rack F gears with two pinions I¹, I² rigidly connected with the pinions J¹ and J² respectively, whose shafts j¹ and j² are mounted in the carriage E. The number of teeth of the pinions I¹ and J¹, as also those of the pinions I² and J², are in the ratio of $\frac{b}{a}$. The pinions J¹ and J² gear respectively with slides K¹ and K² formed as racks and mounted in the carriage E.

In order to assure permanent contact between the roller G and the guide C, it is sufficient to bring into operation a spring k¹ which may act, for example, on one of the racks K¹, in which case one extremity of the spring k¹ is attached to the said rack and the other to a fixed point.

As the guide C is formed in such a way that the centre of the roller G describes a hyperbola c having the equation $$\frac{y^2}{b^2}-\frac{x^2}{a^2}=1$$

every point of the rack K¹ will advance through a distance $\left(\frac{a}{b}y+x\right)$, while every point of the rack K² will advance through a distance $\left(\frac{a}{b}y-x\right)$.

The motions of the racks K¹ and K² may be respectively transmitted to pinions L¹, L², and the pinions L¹ and L² will then receive displacements in rotation, which are inversely proportional to one another. In other words, if the pinion L¹ makes N turns in unit of time, the pinion L² will, in the same time make $\frac{1}{N}$ turns.

Figure 4:
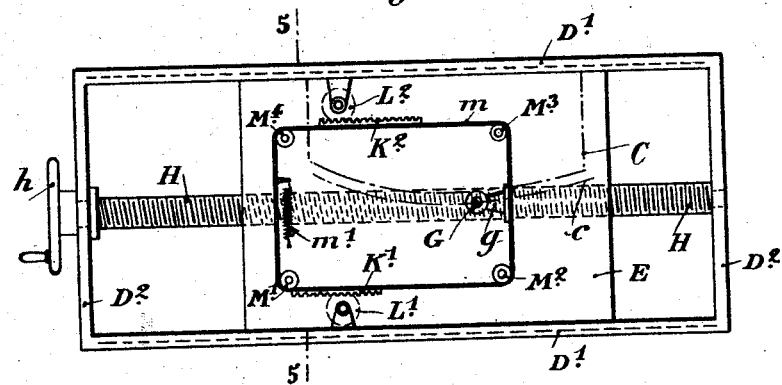
Fig. 4 is a plan view of a second embodiment of the present invention.
Figure 3:
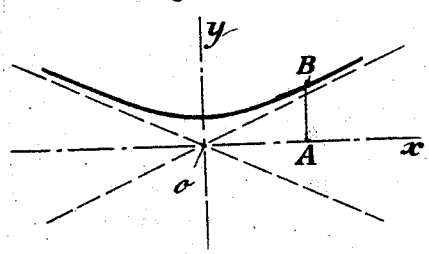
Figure 3 shows a corresponding hyperbola with rectangular co-ordinates $o$—$x$ and $o$—$y$.
Figure 5:
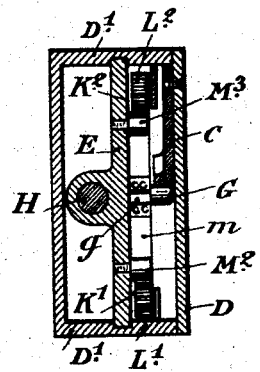
Fig. 5 is a section on the line 5—5 of Fig. 4.

Figs. 4 and 5 respectively represent in plan and in section along the line 5—5 of Figure 4, a modification in which a centre of a roller, mounted on a carriage, as in the preceding example, is caused to describe an equilateral hyperbola, the roller bearing upon a cam for this purpose, which cam is secured as in the preceding example, to the frame of the apparatus.

In this example, the hyperbola which is described by the centre of the roller, has for its equation $y^2-x^2=1$.

The apparatus comprises, as in the preceding example, a carriage E slidably mounted between the long sides D¹ of the frame, and being formed with this object so as to constitute a nut engaging a screw H operable by means of a hand wheel h. The carriage E has mounted thereon the axles of four rollers M¹, M², M³, M⁴ arranged in the form of a rectangle whose sides are respectively parallel and perpendicular to the axis of the apparatus. On these rollers is wound a cable m, to which is secured the support g of the axle of the roller G. A spring m¹, one extremity of which is secured to the cable and the other extremity to a fixed point, tends constantly to keep the roller G in contact with the guide C. Racks K¹ and K² are secured to those sides of the cable m which are parallel to the axis of x of the hyperbola described by the centre of the roller G. These racks K¹ and K² gear respectively with pinions L¹, L².

If the carriage E is displaced by operating the hand wheel h any point on that side of the cable carrying the rack K¹ will be displaced through a distance y+x, while any point of the rack K² will be displaced through a distance y—x. It thereby follows that if the pinion L¹ revolves N turns in a given time, the pinion L² will in the same time revolve a number of turns equal to $\frac{1}{N}$.

It is evident that in the examples described, the transformation of the displacements of the centre of the roller G into displacements according to a sum and a difference of length can be effected in any other manner. It is thus, for example, that in the modification illustrated in Figures 4 and 5, instead of the displacements y—x and y+x being imparted to racks, it would be possible for them to be imparted to any other suitable transmission member.

In particular, the displacements y+x and y—x could be transmitted through any other suitable known mechanism, differential or other.

Figure 6:
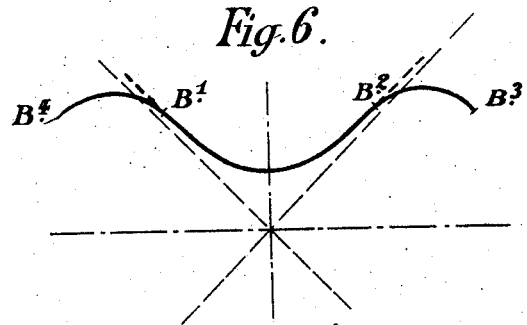
Figs. 6 and 7 illustrate two types of hyperbolical curves that may be employed in constructing the hyperbolic guide.

As shown in the diagram of Figure 6, a movable element, such as the roller G, of the preceding examples, instead of describing a continuous hyperbola, could be made to describe only a part B¹—B² of a hyperbola; while the movable element describes this hyperbolic portion, the mechanism will operate as an inversion apparatus. Beyond these points, the guide curve may be any curve whatever $B^1-B^4$, $B^2-B^3$ cutting the asymptotes of the hyperbola. When the centre of the roller describes these curved portions, the number of turns N communicated to one of the members connected to the roller will pass through zero at the instant when the said centre of the roller lies on one of the asymptotes.

Figure 7:
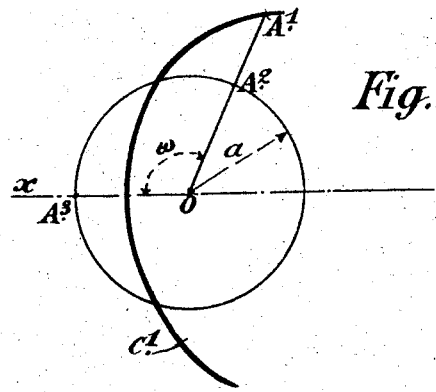

When the apparatus is used in an instrument such as a range finder or an inclinometer, where the members to be displaced for the determination of the distances are respectively proportional to the required distance N and to its inverse $\frac{1}{N}$ then the adjustment of the instrument can be effected for the distance $N = \infty$ Instead of the guide curve being traced to correspond with rectangular coordinates as in Fig. 6, the guide curve could be traced to correspond with polar coordinates, as shown in Figure 7.

In this Figure 7, the curve $C^1$ is traced with reference to a pole O. It is obtained by means of the Cartesian equation to an equilateral hyperbola $y^2 - x^2 = 1$.

In tracing this curve $C^1$ of Fig. 7, the lengths $r$ of the radius vectors starting from the point O, are made equal to the ordinates $y$ of the hyperbola (Fig. 6) increased by a constant 1, and the angles ω at the pole are made to correspond in size to the Cartesian abscissæ $x$ of the hyperbola (Fig. 6) divided by a constant $a$. Thus for each point $A^1$ of the curve $C^1$ (Fig. 7) the length $OA' = y + 1$ and the angle $\omega = \frac{x}{a}$.

If with the point O as centre there is traced a circle $A^2-A^3$ of radius $a$, it is seen that each instant the length of the arc $A^3-A^2$ is equal to $a\omega$. Consequently the quantities $(r-1+a\omega)$ on the one hand and $(r-1-a\omega)$ on the other hand are always inversely proportional.

Figure 9:
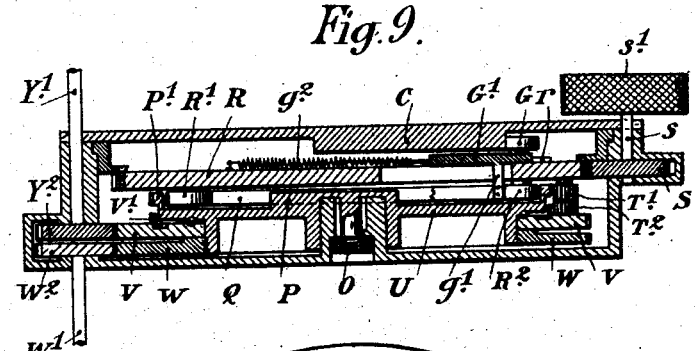
Fig. 9 is a sectional view of the construction illustrated in Fig. 8.
Figure 8:
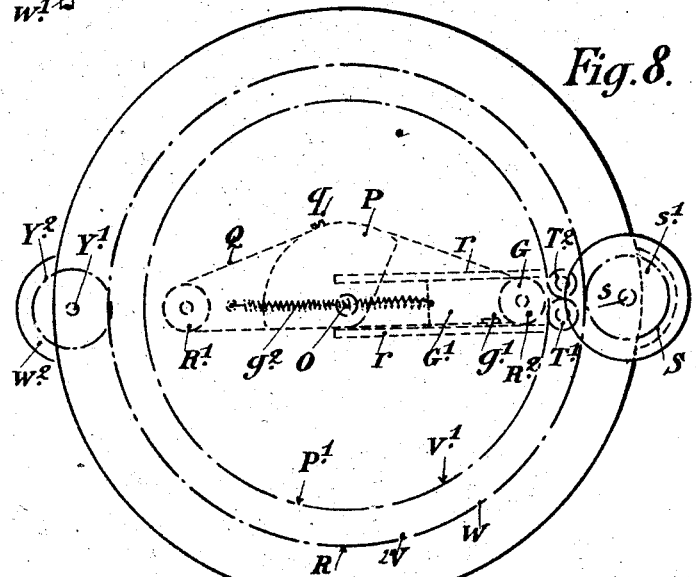
Fig. 8 is a diagrammatic plan of another embodiment of the present invention.

Figures 8 and 9 of the drawing represent in plan and in longitudinal sectional elevation respectively, an apparatus based on the above considerations. This apparatus comprises a fixed guide C traced in such a manner that the centre of a roller G constantly bearing on it describes a curve such as the curve $C^1$ of Figure 7. P is a portion of a circular drum of radius $a$ having its centre at O. A steel band Q is wound on this drum and is secured thereto at a point $q$ to avoid sliding. The band passes onto two rollers $R^1$ $R^2$, whose axles are carried by a toothed wheel R. The roller G is mounted on an axle carried by a slide block $G^1$. This slide block $G^1$ is movable within slides $r$ of the said wheel R, and is submitted to the action of a spring $g^2$ whose other extremity is attached to a fixed point of the wheel R.

If the wheel R is caused to turn through an angle ω, a displacement of the roller G, with reference to the centre O, will be obtained, of magnitude $r-1$. The rotation of the wheel R may be effected, for example by means of a pinion S keyed on an axle $s$ operable by the aid of a milled knob $s^1$. This displacement of the roller G involves that of the band Q which is riveted at $g^1$ to the slide block $G^1$. It thereby follows that the drum P at each instant turns through a magnitude $r-1$ augmented by the quantity $a\omega$.

The wheel R also carries the axles of two pinions $T^1$ and $T^2$, which are in gear with one another. The pinion $T^1$ gears with a set of teeth $P^1$ rigidly connected with the drum P, while the pinion $T^2$ gears with a set of teeth $V^1$ rigidly connected with a toothed wheel V, loosely mounted upon the hub of the drum P. A toothed wheel W is rigidly connected with the drum P and through the intermediary of a pinion $W^2$, transfers its movement with a suitable multiplication, to the shaft $W^1$, while the movement of V is transmitted through a pinion $Y^2$ to a shaft $Y^1$, multiplied in the same way as the movement of W.

It is therefore seen that the movements of the shafts $W^1$ and $Y^1$ are proportional to $r-1+a\omega$ and to $r-1-a\omega$ respectively. Thus the movements of these shafts $W^1$ and $Y^1$ are inversely proportional to one another.

Having now particularly described and ascertained the nature of my said invention and in what manner the same is to be performed, I declare that what I claim is:—

1. A device of the class described comprising a frame, a carriage slidable in the frame, means for moving the carriage, a member having a hyperbolically curved surface secured to the frame, a roller mounted for movement along said surface, means for maintaining the roller in engagement with said surface, a pair of driven elements and means operatively connected to said roller for moving the driven elements through inversely proportional distances.

2. A device of the class described comprising a movable carriage, a roller operatively connected to said carriage, a cam engaged by said roller, a pair of driven elements, and means operatively connected to said roller for moving said elements through distances that are inversely proportional.

3. A device of the class described comprising a member having a hyperbolically curved surface, a roller mounted for movement along said surface, a support for said roller, a movable carriage for said support, means for moving said carriage, a pair of movable elements and means operatively connecting said support and movable elements for moving the latter through inversely proportional distances.

4. In combination, a cam, a roller mounted for movement along the surface of said cam, a support for the roller, a movable carriage for said support, resilient means secured to said carriage and support, means for moving said carriage, a pair of driven elements and means for transmitting the curvilinear movement of the roller to said elements.

5. A device of the class described comprising a member having a hyperbolically curved surface, a roller mounted for movement along said surface, a support for said roller, a movable carriage for said support, means for moving said carriage, a pair of rotatable elements, and a pair of members moved through inversely proportioned distances by said roller engaging said elements.

6. A device of the class described comprising a member having a hyperbolically curved surface, means mounted for movement on said surface, a movable carriage, a flexible member operatively connected to the carriage and said means, a pair of driven elements, and means connected to said flexible member for moving said elements through inversely proportional distances.

7. A device of the class described comprising a hyperbolically curved cam, a member movable along the surface of said cam, resilient means for maintaining said member in engagement with said surface, a movable carriage, flexible means carried by the carriage and operatively connected to said member, a pair of driven elements and means connected to said flexible means for moving said elements through inversely proportional distances.

8. A device of the class described comprising a hyperbolically curved cam, means engaging the surface of said cam, a carriage for said means, guide means secured to the carriage, flexible means secured to said first named means and engaging the guide means, a pair of driven elements, and means actuated by the flexible means for moving said driven elements through inversely proportional distances.

9. In combination, a cam having a hyperbolically curved surface, a movable carriage, means for moving said carriage, a slide-block mounted on the carriage, a roller carried by said block and having engagement with said surface, guide means mounted on said carriage, flexible means engaging the guide means and secured to said block, a rotatable member secured to the flexible means, interengaging means driven by said rotatable member and a pair of driven elements actuated by said rotatable member and said interengaging means.

10. A device of the class described comprising a hyperbolically curved cam, a movable carriage, means for moving said carriage, a slide-block mounted on the carriage, resilient means secured to said carriage and block, a roller carried by said block and having engagement with the surface of said cam, guide means mounted on said carriage, flexible means engaging the guide means and secured to said block, a rotatable member secured to the flexible means, a pair of driven elements and means interposed between said rotatable member and the driven elements for moving the latter through inversely proportional distances.

In testimony whereof I have signed this specification.

ANTOINE CASTELLANI.